United States Patent [19]

Kunz

[11] Patent Number: 4,567,362
[45] Date of Patent: Jan. 28, 1986

[54] PROCESS AND APPARATUS FOR THE FOCUSING OF A BEAM OF LIGHT ON AN OBJECT

[75] Inventor: Rino E. Kunz, Steinmaur, Switzerland

[73] Assignee: GRETAG Aktiengesellschaft, Regensdorf, Switzerland

[21] Appl. No.: 504,602

[22] Filed: Jun. 15, 1983

[30] Foreign Application Priority Data

Jun. 25, 1982 [CH] Switzerland ............ 3923/82

[51] Int. Cl.⁴ ............................................. G01J 1/20
[52] U.S. Cl. ......................................... 250/201; 356/4
[58] Field of Search ................................ 250/201–204, 250/227, 229, 237 G; 354/403, 406, 407; 350/448, 449, 3.6; 356/1, 4

[56] References Cited

U.S. PATENT DOCUMENTS

| | | | |
|---|---|---|---|
| 3,614,456 | 10/1971 | Hamisch | 250/234 |
| 3,682,071 | 8/1972 | Hosoe | 354/406 |
| 3,689,159 | 9/1972 | Taniguchi et al. | 356/123 |
| 3,781,110 | 12/1973 | Leitz et al. | 250/201 |
| 3,902,036 | 8/1975 | Zaleckas | 219/121 L |
| 3,906,220 | 9/1975 | Delingat | 250/237 G |
| 4,074,104 | 2/1978 | Fulkerson | 219/121 LM |
| 4,341,953 | 7/1982 | Sakai et al. | 250/204 |

OTHER PUBLICATIONS

"Optical Profilometer for Monitoring Surface Contours of Si Power Devices", H. P. Kleinknecht and H. Meier, Laboratories RCA Ltd., pp. 266–273.

Primary Examiner—David C. Nelms
Assistant Examiner—J. Gatto
Attorney, Agent, or Firm—Burns, Doane, Swecker & Mathis

[57] ABSTRACT

A laser beam impacts an object through a focusing lens. The beam spot produced on the object is reproduced by means of an optical assembly of three measuring diaphragms in the form of a stripe of a width varying as a function of the state of focusing, with the measuring diaphragms being mutually offset with respect to the ideal focusing point. The light passed by the measuring diaphragms impacts three photoreceivers and the measuring signals produced by them are processed in an evaluating stage to produce a correction signal which then is used for the automatic setting of the focus by means of a control device. The system requires no mechanically oscillating parts, is simple in its configuration and suitable for pulsed laser systems.

42 Claims, 14 Drawing Figures

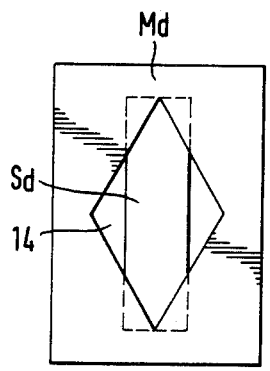
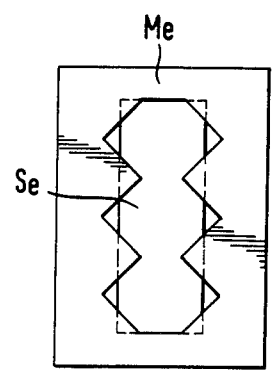
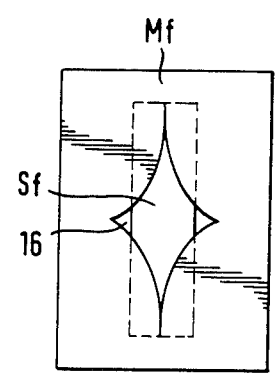
Fig. 4a  Fig. 4b  Fig. 4c
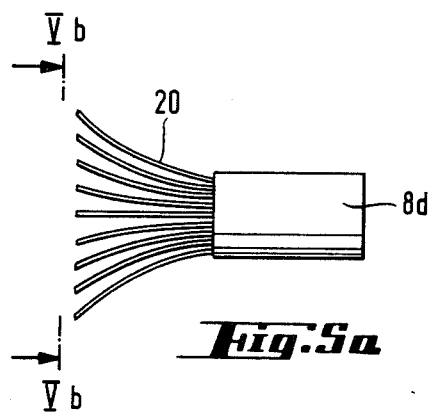
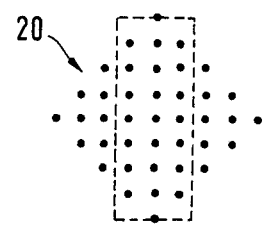
Fig. 5a  Fig. 5b
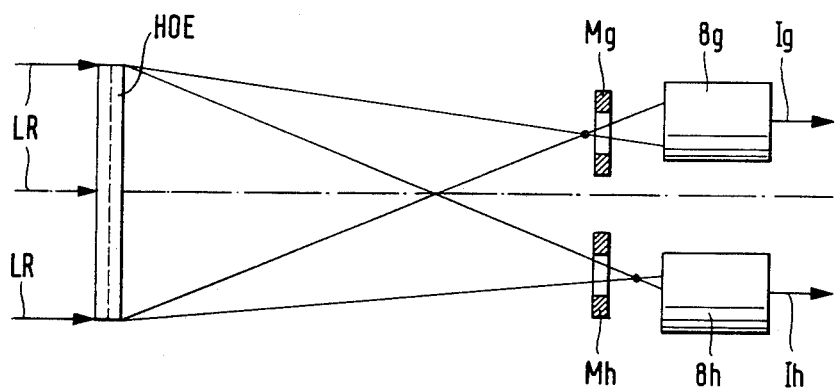
Fig. 6

PROCESS AND APPARATUS FOR THE FOCUSING OF A BEAM OF LIGHT ON AN OBJECT

BACKGROUND OF THE INVENTION

The present invention relates to a process and an apparatus for focusing a light beam, in particular a laser beam, on an object impacted by said laser beam.

The processing of workpieces by means of laser beams is gaining steadily in importance. One of the most significant problems in this context is that of focusing the laser beam on the surface to be worked in an optimum manner while continuously maintaining this optimum focus setting and constantly regulating it.

Various methods are known for focusing and automatic controlling focus setting. One of these is described for example in German Pat. No. 2,034,341 and U.S. Pat. No. 3,689,159. In the method described in these patents, the beam spot produced on the object by the working laser beam or an auxiliary laser is reproduced on a measuring diaphragm oscillating in the direction of the optical axis, with the neutral position of the measuring diaphragm coinciding with the image plane of the beam spot in the case of ideal focusing. The light passed by the diaphragm is guided to a photoreceiver. With optimum focusing, the image of the beamspot is located exactly in the center of the oscillating path of the measuring diaphragm and the variation in time of the measuring signal produced by the photoreceiver yields a symmetrical, essentially sinusoidal curve. In case of deviations from the optimum state of focusing the image of the beam spot is displaced from the center of the oscillating path of the measuring diaphragm and the measuring signal becomes correspondingly asymmetrical. This asymmetry is then evaluated by means of a phase sensitive detector for the setting and continuous regulation of focusing.

A further system described, for example, in German Pat. No. 2,453,364 uses in place of an oscillating measuring diaphragm an oscillating focusing lens.

These known systems work very well in principle, but have a number of disadvantages. They require, for example, a mechanically oscillating measuring or objective lens with all the inherent disadvantages of mechanically moving parts, and they are relatively demanding with respect to electronics. Furthermore, they are intended primarily for continuous lasers and are less suitable for pulsed lasers. Finally, they have no particular sensitivity in the vicinity of the optimum focusing point.

French Pat. No. 94,871 sescribes a laser scanning system for surface reliefs operating essentially without moving parts. In place of one moving measuring diaphragm the beam spot is reproduced simultaneously on two stationary measuring diaphragms. The two measuring diaphragms are located in front of and behind the image plane of the beam spot in the case of ideal focusing. The light passed by the measuring diaphragms impacts on two photoreceivers, the output signals of which represent a measure of the state of focusing or the dimension in depth of the relief scanned.

In this known system the light emitted by the beam spot and finally impacting the two photoreceivers is divided into two separate measuring beam paths by means of two beam splitter/mirrors or a mask in a spatially, entirely inhomogeneous manner. Mechanical and thermal effects and those caused by electrical/magnetic fields and refractory index variations, may affect the two measuring beam paths with different intensity, thereby causing significant measuring errors. The elimination or compensation of harmful effects, on the other hand, is very difficult, laborious and expensive.

U.S. Pat. No. 3,614,456 shows a further focusing system, which operates in a manner similar to that of French Pat. No. 94,871, but with a single measuring diaphragm. This system reacts very sensitively to interference, is difficult to adjust and is therefore not suitable for practical use in systems with high precision requirements.

OBJECTS AND BRIEF SUMMARY OF THE INVENTION

The present invention is intended to improve a process and an apparatus of the above described type, so that, while using the lowest possible number of optical components, a spatially homogeneous distribution of the measuring beam path is obtained, whereby each partial measuring beam experiences the same fate (identical conditions concerning angle of deflection, polarization, temperature of the photoreceivers, etc.). Pulse operation should be possible and the highest possible sensitivity in the vicinity of optimum focusing should be attained.

The foregoing and other objects are achieved as set forth in the appended independent claims. Preferred variants of embodiment and further developments are set forth in the dependent claims.

More specifically, at least two images of a beam spot formed on a workpiece by a light beam are produced by an optical system. A measuring diaphragm is associated with each of the images, and each diaphragm is positioned in a different location relative to the desired position of the beam spot image in the case of optimum focusing. The light passed by the measuring diaphragms is evaluated as a measure of focusing, and the focus of the light beam on the workpiece is adjusted in response to the evaluation.

The optical system that forms the at least two images preferably includes a diffraction grating or an equivalent holographic optical element. The measuring diaphragms are shaped so that the light passed varies in intensity with variations in focusing.

The invention will become more apparent from the drawings attached hereto. In the drawings:

FIGS. 4a–4c illustrate three examples of further possible configurations of measuring diaphragms;

FIGS. 5a and 5b illustrate alternative embodiment of a measuring diaphragm;

FIG. 6 illustrates a second embodiment of an apparatus according to the invention;

DETAILED DESCRIPTION

Figure 1:
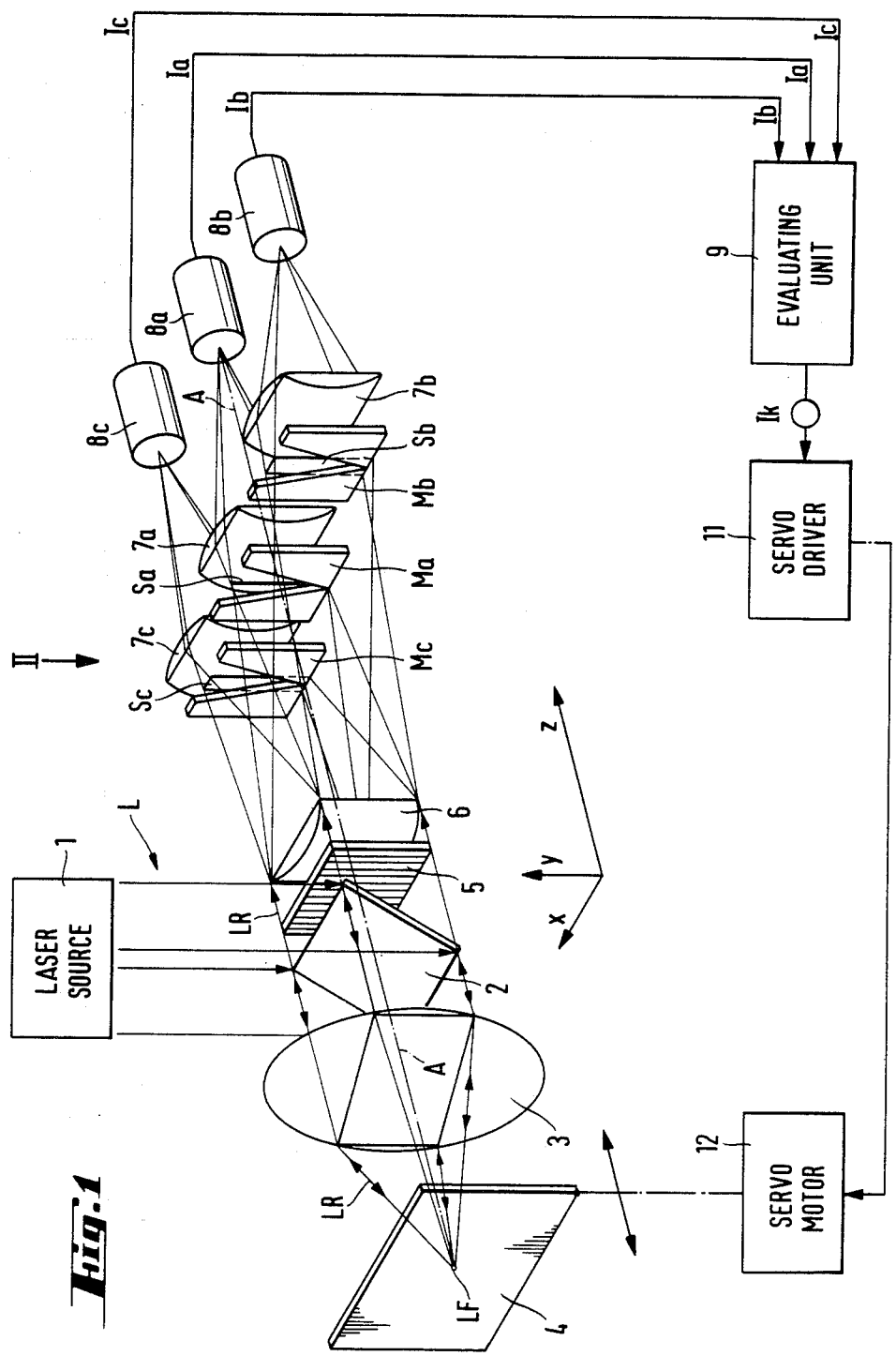
FIG. 1 shows a schematic view of a first embodiment of the apparatus according to the invention.

The laser processing apparatus schematically shown in FIG. 1 is similar in its fundamental configuration to the known state of the art, as indicated for example by the aforementioned U.S. Pat. No. 3,689,159, so that the description following hereinbelow may be restricted to the parts that are essential for the preferred form of the present invention.

The apparatus shown includes a laser source 1, projecting a laser beam L through a semipermeable mirror 2 and a focusing lens 3 onto a workpiece or object 4 to be processed, thereby producing a beam spot LF on said workpiece of a size varying with the focusing state. The reflected laser light LR from this beam spot LF arrives through the focusing lens 3 and the semipermeable mirror 2 onto an optical assembly comprising a diffraction grating (ruled grating) 5 and a cylinder lens 6, which splits the beam path into three parts and reproduces the beam spot LF simultaneously on three measuring diaphragms Ma, Mb and Mc, in the form of three lines or stripes Sa, Sb and Sc, which in the present case are vertical. The measuring diaphragms are offset laterally and in the direction of the optical axis A (Z axis) with respect to each other. The light passing through the measuring diaphragms, i.e. not blocked out by them, is then directed by means of three further cylindric or more generally anamorphic cylinder lenses 7a, 7b and 7c onto three photoreceivers 8a, 8b and 8c and is measured by them. The electrical signals Ia, Ib and Ic corresponding to the light measured depend on the state of focusing and are conducted to an evaluating stage 9, which produces from said signals a correction signal Ik characteristic of the existing state of focusing. This signal is then used by a control device consisting of a servo-drive circuit 11 and a servo-drive motor 12, to displace the workpiece 4 in the direction of the z-axis relative to the focusing lens 3 until the optimum focus setting is attained. Obviously, it is also possible to displace the focusing lens relative to the workpiece.

Figure 2:
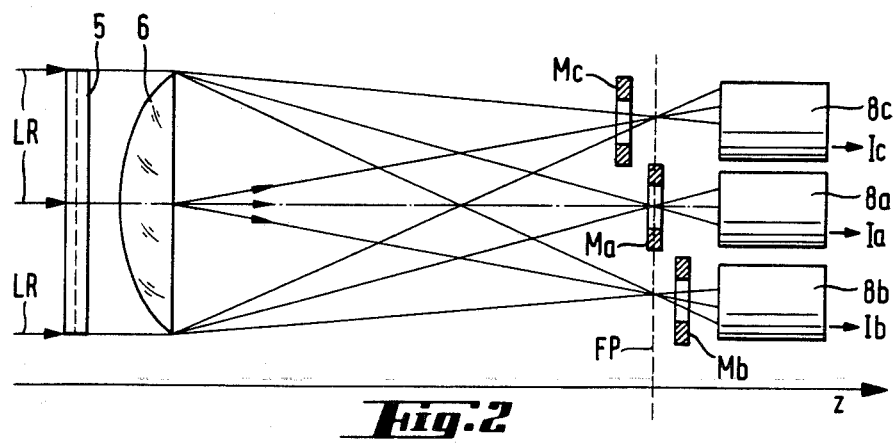
FIG. 2 shows a section of the apparatus of FIG. 1 illustrating in greater detail certain measuring parts of the invention.

FIG. 2 shows relevant parts of the apparatus of FIG. 1 in a plan view, with the cylinder lenses 7a-7c eliminated for the sake of simplicity. As it is seen, the three measuring diaphragms, aside from their lateral offset, are mutually offset in the z direction, i.e. in the direction of the optical axis A of the system. The measuring diaphragm Ma is located exactly in the image or focal plane FP of the system, i.e. in the plane in which the image of the beam spot LF is produced when the laser beam L is focused exactly or optimally on the object 4. The position of this image plane FP shall be designated hereinafter as the desired position. The measuring diaphragm Mb is located slightly behind the measuring diaphragm Ma or the desired position FP, and the measuring diaphragm Mc is located in front of the desired position FP, symmetrically with respect to the diaphragm Mb, such that the axial distance between diaphragm Ma-Mb is equal to the axial distance between diaphragm Ma-Mc. However, situations may be encountered where asymmetrically disposed diaphragms may be advantageous, e.g. to compensate for other asymmetries in the system, for example due to aberrations.

The mode of operation of the three measuring diaphragms Ma-Mc is shown in FIGS. 3a-3d. Each measuring diaphragm is equipped with a V-shaped diaphragm orifice 13, arranged symmetrically with respect to the associated images Sa, Sb, Sc of the beam spot LF.

Figures 3A, 3B, 3C:
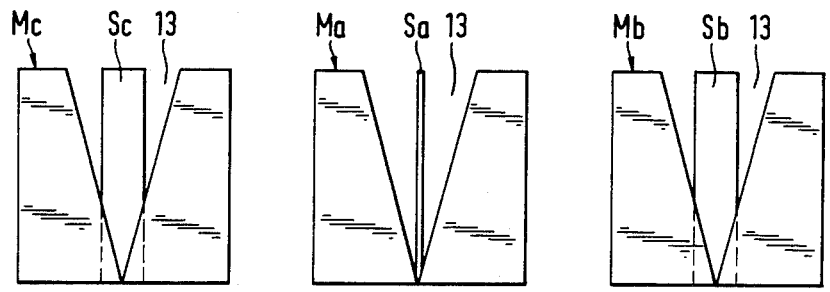
FIGS. 3a–3d are diagrams illustrating the measuring diaphragms and a response curve for purposes of explaining the mode of operation of the FIG. 1 embodiment.

The representations in FIGS. 3a-3c corresponds to the conditions of optimum focusing. Under this condition, the image Sa of the beam spot LF is produced exactly at the axial location of the diaphragm Ma and is ideally a narrow, line-shaped image, so that practically none of this image is blocked by the measuring diaphragm Ma. The corresponding measuring signal Ia of the photoreceiver 8a is thus a maximum under this desired condition. The two other measuring diaphragms 8b and 8c are outside the exact image plane, so that the images Sb and Sc of the beam spot LF appear on them in the form of relatively wide stripes. Because of the configuration of the diaphragm orifices 13, with increasing widths of the images a greater part of the light is blocked and the measuring signal Ib or Ic of the associated photoreceiver becomes correspondingly smaller.

Figure 3D:
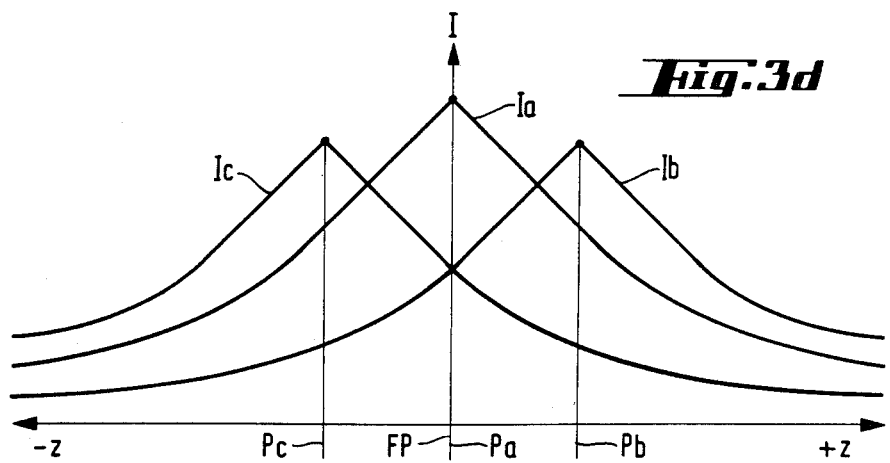

The situation is similar when the laser beam L is not focused accurately on the workpiece 4. In this case, the three images Sa-Sc of the beam spot LF do not appear exactly in the desired position FP but either in front or behind. Correspondingly, the measuring signals Ia-Ic of the three photoreceivers 8a-8c will assume an intermediate value between their possible extreme values. In FIG. 3d, the variations of the three measuring signals Ia-Ic are shown as functions of the displacement of the actual image plane of the three beam spot images with respect to the desired position FP and thus simultaneously as functions of the state of focusing. The abscissa points Pc, Pa and Pb mark the positions of the three measuring diaphragms Mc, Ma and Mb.

It follows from the above that conclusions may be drawn from the size of the three measuring signals Ia-Ic concerning the prevailing state of focusing. If Ic is larger than Ib, the object 4 is too far from the focusing lens 3. If, conversely, Ib is larger than Ic, the object 4 is too close to the lens 3. The point of optimum focusing is attained when the two measuring signals Mb and Mc are of equal size, i.e. the measuring signal Ma is at a maximum. It is further obvious that in principle two measuring diaphragms alone are sufficient to determine the deviation from the optimum focusing point with respect to direction and amount. The use of a third measuring diaphragm in the desired position yields, however, an improvement of the characteristic curve, together with compensation of certain interference values, such a variation of the beam intensity or the surface properties of the object 4.

The correction signal Ik characteristic of the state of focusing may be calculated in the evaluation unit 9 approximately by the formula $Ik = Ib - Ic$ when two measuring diaphragms Mb and Mc are used and approximately by the formula $Ik = (Ib - Ic)/Ia$ when all three measuring diaphragms Ma-Mc are used.

As shown in FIG. 3d, the relationship between the measuring signal and the state of focusing, when 3 measuring diaphragms are used according to FIGS. 3a-3c, is essentially linear in the vicinity of the point of optimum focusing. The correction signal Ik behaves in a similar manner, while its slope and thus the sensitivity of the system in the vicinity of the focus point may be adapted by an appropriate configuration of the measuring diaphragms to actual requirements. Naturally, nonlinear characteristic curves may be obtained by using suitable forms of the measuring diaphragms and of optical imaging (for example spherical lenses).

In FIGS. 4a-4c, three further possible configurations of the measuring diaphragms are shown. The measuring diaphragm Md according to FIG. 4a has a rhomboidal diaphragm orifice 14 and yields a characteristic curve twice as steep as the V diaphragms described above. The same is true for the measuring diaphragm Me in FIG. 4b, with the difference that it has an uncontrolled dead zone for a certain minimum deviation from optimum focusing. The measuring diaphragm Mf according to FIG. 4c finally has a diaphragm orifice 16 bordered by convex edges and yields a curved characteristic line which is particularly steep in the vicinity of the optimum focal point.

The description set forth immediately hereinabove relates to different characteristics obtained with various shapes of transmitting measuring diaphragms. It is evident that reflecting measuring diaphragms are also suitable for the invention. Measuring diaphragms may further be realized by means of an appropriately shaped inlet window of the photoreceivers or a suitable configuration or arrangement of the photoreceivers themselves or by means of certain light conductor arrangements or the like. The latter is shown for example in FIGS. 5a and 5b, where a bundle of light conductors 20 is effected so that the light inlet surfaces of all of the individual conductors are in one plane and have for example the configuration shown in FIG. 5b. This arrangement of photoconductors is approximately equivalent to the measuring diaphragms according to FIG. 4a.

It is further understood that the splitting of the reflected laser light LR into three beam paths must not necessarily be effected by means of a diffraction grating. Naturally, other means such as beam splitters or the like, may also be used. Furthermore, it is not absolutely necessary to reproduce the beam spot LF in the form of a line or a stripe, as naturally any other geometric shape is possible. Imaging as a line, however, proved to be particularly appropriate in view of the control behavior of the entire system.

An especially advantageous and elegant mode of imaging the beam spot LF may involve the use of a hologram or a holographic optical element, respectively. As a hologram is able to perform several optical functions simultaneously, this makes an especially compact configuration of the apparatus possible. FIG. 6 shows an examplary embodiment of the apparatus according to the invention equipped with two photoreceivers only.

The light LR reflected by the beam spot arrives through the focusing lens 3, not shown, and and the mirror 2 onto a holographic optical element HOE. The latter modulates the light and thereby produces two line or stripe shaped images of the beam spot. These images may be located in one plane, whereupon it would be necessary to operate, as in FIGS. 1 and 2, with axially offset measuring diaphragms. In the example according to FIG. 6, the two images are mutually offset and the two measuring diaphragms Mg and Mh are located in one plane between the two image planes of the beam spot. The light passed by the two measuring diaphragms impacts the two photoreceivers 8g and 8h, the measuring signals Ig and Ih of which are then further processed in keeping with the aforedescribed process.

Figure 7:
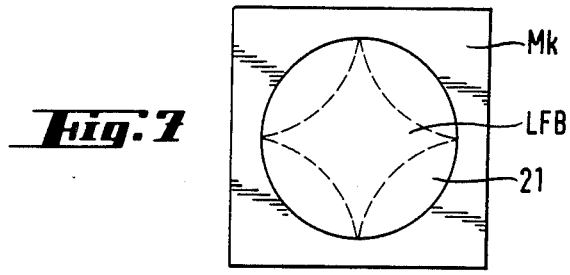
FIG. 7 illustrates an examplary measuring diaphragm and beam spot image produced at the diaphragm in accordance with the FIG. 6 embodiment; and, FIG. 8 is a schematic diagram illustrating the preparation of a holographic element for the examplary embodiment according to FIG. 6.

With the aid of the holographic optical element or hologram HOE the geometric form of the images of the beam spot may further be affected or selected so that the measuring diaphragms may have a very simple configuration or may be eliminated altogether. This is shown as an example in FIG. 7, wherein the image LFB of the beam spot is approximately star-shaped and the diaphragm orifice 21 of the measuring diaphragm Mk is circular.

Figure 8:
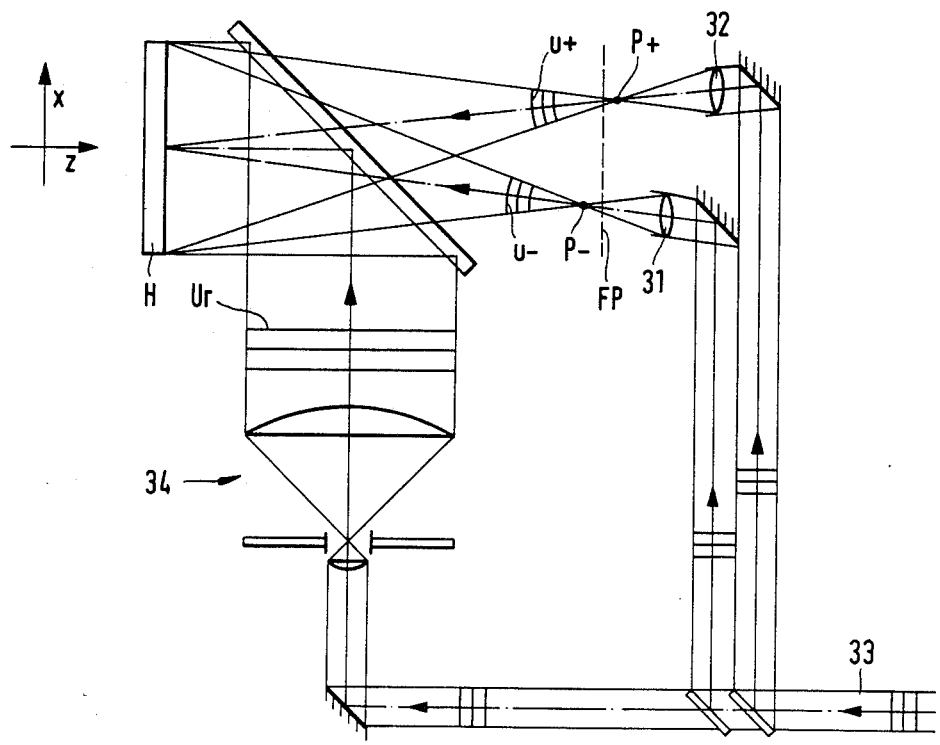

The production of the hologram may be effected by conventional methods and shall be described hereinafter purely as an example for a hologram producing two images mutually offset in the axial direction, (and transversely to it), in accordance with FIG. 8.

To produce a hologram with two spatially arranged image points P+ and P−, it is merely necessary to record the interference pattern of the spherical waves u+ and u− emanating from the two points P+ and P− with a planar reference wave Ur on a plate H coated with a photosensitive recording material. The two spherical waves u+ and u− are produced by means of two lenses 31 and 32 with the points P+ and P− as the focal points, form a laser beam 33. Similarly, the planar reference wave Ur is derived from a laser beam 33 by means of a beam expander 34.

The photographically developed and fixed hologram plate H may now be inserted as the holographic optical element HOE in the apparatus according to FIG. 6 and then yields, when illuminated from the reverse side (in FIG. 8 from the left), the two desired images of the beam spot.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A process for focusing a light beam, in particular a laser beam, on an object, comprising the steps of producing by means of an optical system at least two images of a beam spot formed by the light beam on the object, providing a measuring diaphragm associated with each of said at least two images, said diaphragm being located in different positions relative to the desired position of the image of the beam spot in the case of optimum focusing, evaluating the intensities of the light not blocked out by the measuring diaphragms as a measure of focusing, and adjusting the focusing of the light beam in response to the evaluation, said at least two images of the beam spot being produced by means of a diffraction grating.

2. A process according to claim 1 wherein the beam spot is reproduced on the measuring diaphragms in the form of a strip of light of a width varying as a function of the state of focusing.

3. A process according to claim 2 wherein the measuring diaphragms have an essentially V-shaped orifice.

4. A process according to claim 2 wherein the measuring diaphragms have an essentially rhomboidal diaphragm orifice, one diagonal whereof is located essentially in a center axis of the strip of light.

5. A process according to claim 2 wherein the measuring diaphragms have a diaphragm orifice bordered by nonlinear edges.

6. A process according to claim 1 wherein three images of the beam spot are produced, with one of the measuring diaphragms being located in front, one of the measuring diaphragms essentially in, and one of the measuring diaphragms behind the desired position of the image of the beam spot when optimally focused.

7. Apparatus for the focusing of a beam of light, in particular a laser beam, on an object impacted by said beam, comprising an optical system which produces at least two images of a beam spot formed by the beam on the object, the optical system comprising a diffraction grating, two measuring diaphragms each associated with one image, said diaphragms being arranged in different positions relative to the desired positions of the images of the beam spot in the case of optimum focusing, and opto-electrical means for measuring the light not blocked out by the measuring diaphragms and producing a signal characteristic of the state of focusing.

8. Apparatus according to claim 7 wherein the optical system reproduces the beam spot in the form of a strip of light with a width varying as a function of the state of focusing, onto the measuring diaphragms.

9. Apparatus according to claim 7 wherein the measuring diaphragms have essentially triangular orifices.

10. Apparatus according to claim 7 including control means for automatically optimizing the focusing of the beam on the object as a function of the characteristic signal produced by the opto-electric means.

11. Apparatus according to claim 8 including control means for automatically optimizing the focusing of the beam on the object as a function of the characteristic signal produced by the opto-electric means.

12. Apparatus according to claim 9 including control means for automatically optimizing the focusing of the beam on the object as a function of the characteristic signal produced by the opto-electric means.

13. Apparatus according to claim 7 wherein the measuring diaphragms are formed by light inlet surfaces of the opto-electrical means essentially arranged in one plane of light conducting elements, in particular light conducting fibers.

14. Apparatus according to claim 8 wherein the measuring diaphragms are formed by light inlet surfaces of the opto-electrical means essentially arranged in one plane of light conducting elements, in particular light conducting fibers.

15. Apparatus according to claim 9 wherein the measuring diaphragms are formed by light inlet surfaces of the opto-electrical means essentially arranged in one plane of light conducting elements, in particular light conducting fibers.

16. Apparatus according to claim 10 wherein the measuring diaphragms are formed by light inlet surfaces of the opto-electrical means essentially arranged in one plane of light conducting elements, in particular light conducting fibers.

17. Apparatus according to claim 7 wherein three measuring diaphragms are present, with one of the measuring diaphragms disposed in front, one of the diaphragms essentially in and one diaphragm behind the desired position of the image of the beam spot with an optimally focused beam of light.

18. Apparatus according to claim 8 wherein three measuring diaphragms are present, with one of the measuring diaphragms disposed in front, one of the diaphragms essentially in and one diaphragm behind the desired position of the image of the beam spot with an optimally focused beam of light.

19. Apparatus according to claim 9 wherein three measuring diaphragms are present, with one of the measuring diaphragms disposed in front, one of the diaphragms essentially in and one diaphragm behind the desired position of the image of the beam spot with an optimally focused beam of light.

20. Apparatus according to claim 10 wherein three measuring diaphragms are present, with one of the measuring diaphragms disposed in front, one of the diaphragms essentially in and one diaphragm behind the desired position of the image of the beam spot with an optimally focused beam of light.

21. Apparatus according to claim 13 wherein three measuring diaphragms are present, with one of the measuring diaphragms disposed in front, one of the diaphragms essentially in and one diaphragm behind the desired position of the image of the beam spot with an optimally focused beam of light.

22. Apparatus for focusing a beam of light on a workpiece comprising:
optical means for producing at least two shaped images of a beam spot formed by the beam of light on the workpiece;
a first measuring diaphragm having a shaped opening therethrough, the first measuring diaphragm being associated with one of the images and being positioned in spaced relation in one direction relative to a desired focal position of the one image, the shape of the opening cooperating with the shape of the image to cause variations in the intensity of light passing through the opening in response to variations in the focus of the beam of light on the workpiece;
a second measuring diaphragm having a shaped opening therethrough, the second measuring diaphragm being associated with another of the images and being positioned in spaced relation in a direction opposite said one direction relative to a desired focal position of the other image, the shape of the opening cooperating with the shape of the image to cause variations in the intensity of light passing through the opening in response to variations in the focus of the beam of light on the workpiece;
means for evaluating the light passing through the opening in the first and second measuring diaphragms; and
means for modifying the focus of the light beam on the workpiece in response to said evaluating means.

23. Apparatus of claim 22 wherein said optical means comprises a diffraction grating which shapes the image of the beam spot into at least two elongated, relatively narrow stripes, and means for focusing each of said stripes at the respective desired focal positions of the image.

24. Apparatus of claim 22 wherein said optical means comprises holographic optical means for shaping the image of the beam spot into at least two identical images focused at the respective desired focal positions of the image.

25. Apparatus for focusing a laser beam on a workpiece comprising:
an optical element disposed to receive an image of a beam spot formed by the laser beam on the workpiece, the optical element forming at least first and second images of the beam spot each having a unique shape differing from the shape of the beam spot on the workpiece and varying in size in relation to the focus of the beam spot on the workpiece;
signal generating means for receiving each of the first and second images of the beam spot and photoelectrically generating measuring signals in response thereto the signal generating means being arranged such that a first and second measuring signals of equal values are produced when the beam spot on the workpiece is at optimum focus, one of said first and second signals being greater than the other by an amount increasing with the amount of focus error of the beam spot relative to optimum focus in one direction and the other of the first and second signals being greater than the one by an amount increasing with the amount of focus error of the beam spot relative to optimum focus in a direction opposite said one direction, means for modifying the focus of the beam spot on the workpiece in response to said first and second signals.

26. Apparatus of claim 25 wherein said optical element is a diffraction grating producing at least two images of the beam spot in the form of elongated stripes.

27. Apparatus of claim 25 wherein said signal generating means includes first and second photoelectric cells disposed to receive the respective first and second images of the beam spot and to generate respective first and second signals related in value to the intensity of light received thereby, and first and second measuring diaphragms disposed between said optical element and the first and second photoelectric cells, respectively, the diaphragms having openings shaped to vary the amount of light from the images which is received by the respective photoelectric cells as a function of the focusing error of the beam spot on the workpiece.

28. Apparatus according to claim 7 wherein the measuring diaphragms have essentially rhomboidal diaphragm orifices.

29. A process for focusing a light beam, in particular a laser beam, on an object, comprising the steps of producing by means of an optical system at least two images of a beam spot formed by the light beam on the object, providing a measuring diaphragm associated with each of said at least two images, said diaphragms being located in different positions relative to the desired position of the image of the beam spot in the case of optimum focusing, evaluating the intensities of the light not blocked out by the measuring diaphragms as a measure of focusing, and adjusting the focusing of the light beam in response to the evaluation, said at least two images of the beam spot being produced by means of a holographic optical element.

30. A process according to claim 29, wherein the beam spot is reproduced on the measuring diaphragms in the form of a strip of light of a width varying as a function of the state of focusing.

31. A process according to claim 29, wherein the measuring diaphragms have an essentially V-shaped orifice.

32. A process according to claim 29, wherein the measuring diaphragms have an essentially rhomboidal diagram orifice, one diagonal whereof is located essentially in a center axis of the strip of light.

33. A process according to claim 29, wherein the measuring diaphragms have a diaphragm orifice bordered by non-linear edges.

34. Apparatus for the focusing of a beam of light, in particular a laser beam, on an object impacted by said beam, comprising an optical system which produces at least two images of a beam spot formed by the beam on the object, the optical system comprising a holographic optical element, two measuring diaphragms each associated with one image, said diaphragms being arranged in different positions relative to the desired positions of the images of the beam spot in the case of optimum focusing, and opto-electrical means for measuring the light not blocked out by the measuring diaphragms and producing a signal characteristic of the state of focusing.

35. Apparatus according to claim 34, wherein the optical system reproduces the beam spot in the form of a strip of light with a width varying as a function of the state of focusing, onto the measuring diaphragms.

36. Apparatus according to claim 34, wherein the measuring diaphragms have essentially triangular orifices.

37. Apparatus according to claim 34, wherein the measuring diaphragms have essentially rhomboidal diaphragm orifices.

38. Apparatus according to claim 34, including control means for automatically optimizing the focusing of the beam on the object as a function of the characteristic signal produced by the opto-electric means.

39. Apparatus according to claim 35, including control means for automatically optimizing the focusing of the beam on the object as a function of the characteristic signal produced by the opto-electric means.

40. Apparatus according to claim 36, including control means for automatically optimizing the focusing of the beam on the object as a function of the characteristic signal produced by the opto-electric means.

41. Apparatus according to claim 37, including control means for automatically optimizing the focusing of the beam on the object as a function of the characteristic signal produced by the opto-electric means.

42. Apparatus according to claim 34, wherein the measuring diaphragms are formed by light inlet surfaces of the opto-electrical means essentially arranged in one plane of light conducting elements, in particular light conducting fibers.

* * * * *